United States Patent [19]
Tsuzuki et al.

[11] Patent Number: 5,785,782
[45] Date of Patent: Jul. 28, 1998

[54] SLIP-PREVENTING VEHICLE TIRE

[75] Inventors: Yasuhiro Tsuzuki, Tokyo; Tadashi Abe, Miyagi, both of Japan

[73] Assignee: Tsuzuki Electric Corporation, Japan

[21] Appl. No.: 574,375

[22] Filed: Dec. 18, 1995

Related U.S. Application Data

[63] Continuation of Ser. No. 431,641, May 2, 1995, abandoned.

[51] Int. Cl.$^6$ ................................................ B60C 11/16
[52] U.S. Cl. .................................................... 152/210
[58] Field of Search ................................ 152/210, 211, 152/208, 212, 209 R

[56] References Cited

U.S. PATENT DOCUMENTS

| | | | |
|---|---|---|---|
| 2,109,691 | 3/1938 | D'Ayguesvives | 152/209 R |
| 5,164,027 | 11/1992 | Omi | 152/212 |

FOREIGN PATENT DOCUMENTS

| | | |
|---|---|---|
| 12801 | 11/1910 | France . |
| 2318801 | 10/1974 | Germany . |
| 2183205 | 6/1987 | United Kingdom . |

*Primary Examiner*—Francis J. Lorin
*Attorney, Agent, or Firm*—Barry R. Lipsitz; Ralph F. Hoppin

[57] ABSTRACT

A slip-preventing tire improves braking and handling properties on a frozen, icy, or snow-packed road. A tire for use especially in winter has a number of slip-preventing structures which are embedded in the tire tread. A number of cylindrical grooves in the tire tread extend inwardly to a predetermined depth. A slip-preventing structure, which includes a number of brush-like wire members, is fixed in each of the grooves. The wire members contact the road surface thus improving the grip of the tire. Additionally, when the tire is operated on a wet roadway, the grooves act to draw in water while the wire members hold the water in the groove. This allows the tread surface to more firmly contact the roadway. The tire therefore provides improved traction in all seasons.

19 Claims, 11 Drawing Sheets

| | TIRE | ROAD | SPEED | BRAKING DISTANCE | TIME | TEMP. | HUMID. |
|---|---|---|---|---|---|---|---|
| VEHICLE FOR ON-ROAD | STUD-LESS | MIRROR BAHN | 20Km/h | 23.45m | 8.2sec | -2°C | 50% |
| | THE INVENTION | MIRROR BAHN | 20Km/h | 8.06m | 5.0sec | 0°C | 38% |
| | STUD-LESS | MIRROR BAHN | 30Km/h | 37.20m | 10.3sec | 3°C | 50% |
| | THE INVENTION | MIRROR BAHN | 30Km/h | 23.76m | 8.5sec | 0°C | 50% |
| | STUD-LESS | MIRROR BAHN | 40Km/h | 65.23m | 12.10sec | -3°C | 39% |
| | THE INVENTION | MIRROR BAHN | 40Km/h | 53.69m | 9.9sec | 0°C | 50% |
| | STUD-LESS | RUGGED BAHN | 30Km/h | 37.46m | 9.9sec | 0°C | 40% |
| | THE INVENTION | RUGGED BAHN | 30Km/h | 23.81m | 6.2sec | 1°C | 100% |
| | STUD-LESS | RUGGED BAHN | 40Km/h | 51.92m | 9.7sec | 0°C | 95% |
| | THE INVENTION | RUGGED BAHN | 40Km/h | 37.20m | 7.4sec | -1°C | 100% |
| VEHICLE FOR OFF-ROAD | STUD-LESS | MIRROR BAHN | 20Km/h | 29.07m | 11.2sec | 0°C | 90% |
| | THE INVENTION | MIRROR BAHN | 20Km/h | 11.92m | 5.7sec | -2°C | 35% |
| | STUD-LESS | MIRROR BAHN | 30Km/h | 54.28m | 11.5sec | 1°C | 50% |
| | THE INVENTION | MIRROR BAHN | 30Km/h | 32.89m | 9.7sec | 0°C | 40% |
| | STUD-LESS | MIRROR BAHN | 40Km/h | 73.20m | 11.5sec | 0°C | 50% |
| | THE INVENTION | MIRROR BAHN | 40Km/h | 59.29m | 9.8sec | -2°C | 35% |
| | STUD-LESS | RUGGED BAHN | 30Km/h | 31.30m | 6.9sec | -1°C | 50% |
| | THE INVENTION | RUGGED BAHN | 30Km/h | 23.23m | 6.8sec | -1°C | 65% |
| | STUD-LESS | RUGGED BAHN | 40Km/h | 32.30m | 5.7sec | -1°C | 70% |
| | THE INVENTION | RUGGED BAHN | 40Km/h | 27.33m | 5.9sec | -1°C | 65% |

SLIP-PREVENTING VEHICLE TIRE

This application is a continuation of application Ser. No. 08/431,641, filed May 2, 1995, now abandoned.

BACKGROUND OF THE INVENTION

The present invention relates to preventing tire slippage on a wet or snow-packed road. In particular, a slip-preventing vehicle tire and a slip-preventing apparatus for use with a vehicle tire on a wet, frozen, or snow-packed road are presented.

Many vehicle accidents occur on wet, frozen, or snow-packed frozen roads due to slippage between the vehicle's tires and the road, resulting in a corresponding toll in injuries and property damage. This is a result, of course, of the reduced frictional resistance between a tire and the road due to a wet, frozen or snow-packed road surface which dramatically reduces the braking and handling capabilities of the vehicle.

For example, on a roadway which is wet from rain water, it is known that a vehicle tire may experience hydroplaning when a thin sheet of water is formed between the tire tread and the roadway surface. At this condition, the tire can lose all traction and the motorist is no longer able to control the vehicle. Moreover, hydroplaning can occur even when only a portion of a roadway is wet, for example, in a puddle.

Moreover, in geographic areas which experience significant amounts of snow or other hazardous winter weather, tire traction is also significantly reduced. In particular, icy roads can render a vehicle uncontrollable. Consequently, facilities have been developed for the purpose of removing snow and ice from the road. In particular, snow plow equipped vehicles can physically displace snow or slush from the travel lanes of a roadway, and substances such as salt and sand can be deposited on the roadway to promote melting of snow and ice to increase vehicle traction. However, these approaches are expensive to implement, and it is impossible to maintain a good road surface at all times. Additionally, the above-mentioned approaches have undesirable side-effects, including roadway damage and vehicle corrosion.

Therefore, to prevent accidents caused by tire slippage, a vehicle slippage-preventing countermeasure is required that does not damage the roadway or the vehicle. Various measures have been used to prevent a vehicle tire from slipping on a roadway. In particular, tires have been designed with a number of metal spikes mounted permanently in the tread. In operation, the metal spikes in the tire dig into the frozen or snow-packed roadway in order to provide a gripping force. This can be a problem, however, since the spikes tend to cut out the roadway on portions of the road where there is little or no snow cover.

Additionally, the spiked tire can cause dust or debris to be thrown up from the road surface. In fact, in some urban areas which have a heavy traffic volume, a tremendous amount of dust is created by vehicles with spiked tires. This dust is said to rise to the level of creating a health hazard in some cases. To this end, the use of spiked tires is prohibited or regulated in many areas.

Studless tires have also been used to reduce tire slippage on a roadway. A studless tire, also known as a snow tire, does not have protruding spikes and has therefore become a popular choice as a vehicle tire. Specifically, a studless tire can provide increased traction by using a special tread pattern or tread compound. For example, a number of slits can be formed in the tread to produce an aggressive tread pattern that provides good drainage properties and can grip a snowy surface.

Additionally, a generally used studless tire employs a tread compound which has concave portions which contain numerous fine bubbles. A strong gripping force results by a sucking action at the concave portions of the tread. However, in this type of studless tire, since the bubbles contained within the tread compound are formed randomly, the distribution of bubbles which meet the roadway surface is likely to be nonuniform. To this end, the random bubble distribution and other manufacturing tolerances will result in considerable variations in gripping performance of individual tires.

Additionally, the gripping performance of the tire can deteriorate rapidly with use, and there are some cases where almost no improvement is observed in the deteriorated article. Furthermore, such tires are known to have a reduced overall tread life due to the softness of the compound used.

Moreover, even if these types of studless tires effectively function with the designed tread pattern and composition, test results have shown that the gripping performance of these studless tires is greatly inferior compared to the spiked tire when braking and handling are considered. Accordingly, from the standpoint of tire traction and durability, existing studless tires are less desirable than the spiked tire.

Of course, compared to spiked tires, the studless tire greatly reduces the problem of dust and debris thrown into the air. Moreover, some communities attempt to minimize the damage caused by spiked tires by regulating their use. Nevertheless, it would be desirable to have a slip-preventing vehicle tire that can provide increased traction and thereby reduce accidents on frozen or snow-packed roads, but which does not suffer from the aforementioned disadvantages of existing studded and studless tires.

SUMMARY OF THE INVENTION

In order to solve the problems discussed above, the present invention employs the following features. Specifically, a number of slip-preventing structures located in the tire contact the road surface during operation. The slip-preventing structure comprises a cylindrical groove formed in the tread. The groove begins at the outer portion of the tread which contacts the road surface and travels inwardly in the tread to a predetermined depth. The groove includes a slip preventing member disposed therein. The slip preventing member comprises a plurality of wire members held within the groove.

In operation, when the region of the tire containing the groove contacts the roadway, the interior space within the groove will deform and expand due to the weight of the vehicle. A reduced pressure will be created in the groove which acts to draw water or snow on the roadway up into the groove. At the same time, water drawn into the groove by the sucking action will be held there among the plurality of wire members. In particular, surface adhesion among the plurality of wire members and the water will hold the water in the groove, while frozen particles such as snow or slush will be held in the groove due to a tensile force. The groove thus acts to suck water or snow away from the roadway surface, thereby allowing the tire to gain more traction.

Furthermore, the deformation of the groove which directly confronts the road surface will result in the free ends of the wire members disposed within the groove protruding relative to the tread surface and contacting the roadway. The wire members will accordingly exert a gripping force that further increases the traction of the tire, particularly on an icy, frozen, or snow-packed road surface.

Subsequently, when the region of the tire containing a particular groove rotates further so that it is no longer in contact with the roadway, the water or snow held among the wire members in the groove will also move to a position which does not directly confront the roadway. The deforming force on the groove will be removed, and the groove will be restored substantially to its original shape. As a result, the sucking force of the groove will dissipate. The removal of the sucking force in combination with the centrifugal force caused by the tire rotation will act to expel the water and snow located in the groove.

Therefore, in accordance with the present invention, a vehicle tire is presented which has a tread surface with excellent water and snow discharging properties. An improved gripping force results, thereby allowing motorists to drive safely on rainy, snow-packed, or frozen roadways. The tire can thus be effectively used in all seasons.

DETAILED DESCRIPTION OF THE INVENTION

A preferred embodiment of the present invention will now be described in more detail with reference to the accompanying drawings.

Figure 1:
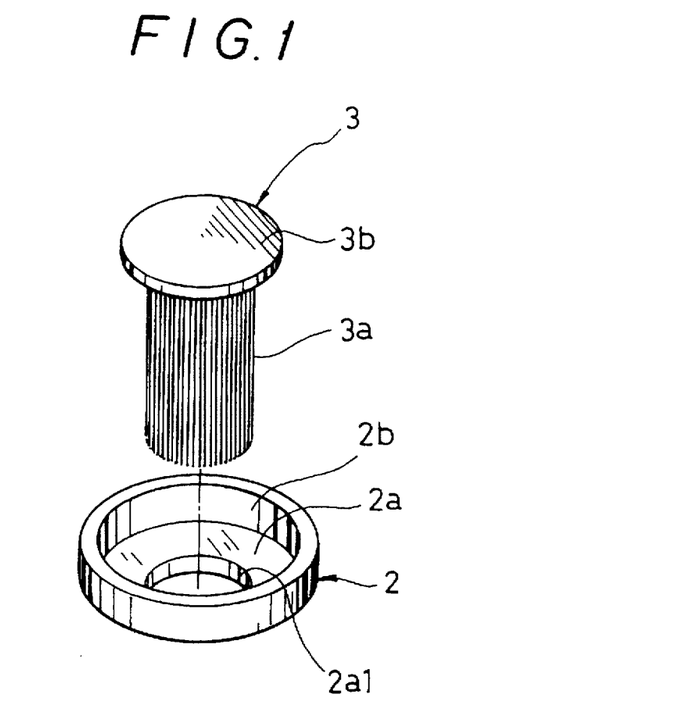
FIG. 1 is an exploded perspective view showing a slip preventing member in a first embodiment of the present invention.
Figure 2A:
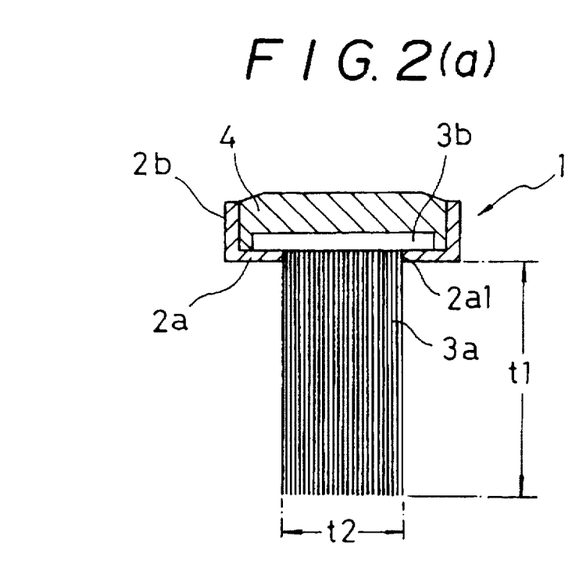
FIG. 2(a) is a longitudinal cross-sectional view of the slip-preventing member of FIG. 1.
Figure 2B:
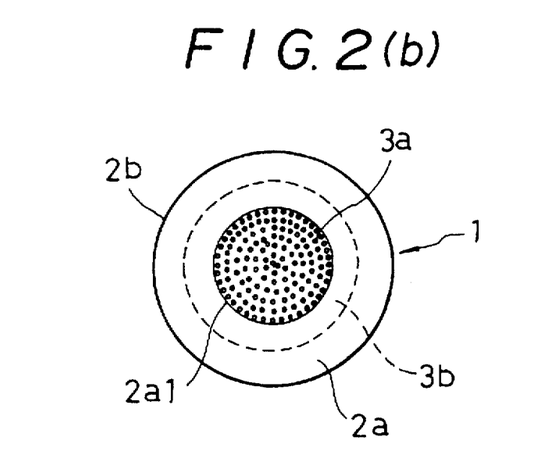
FIG. 2(b) is a bottom view of the slip-preventing member of FIG. 1.
Figure 3:
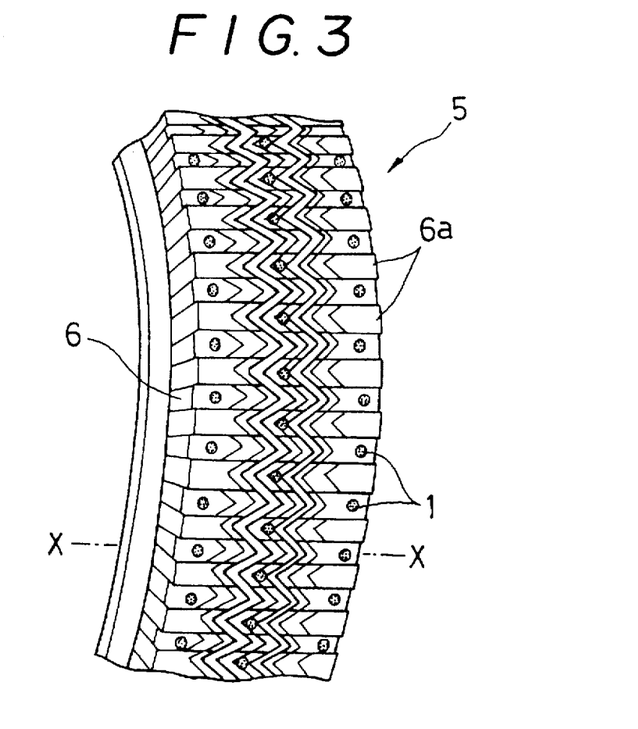
FIG. 3 is a fragmentary perspective view of a vehicle tire in a first embodiment of the present invention.
Figure 4:
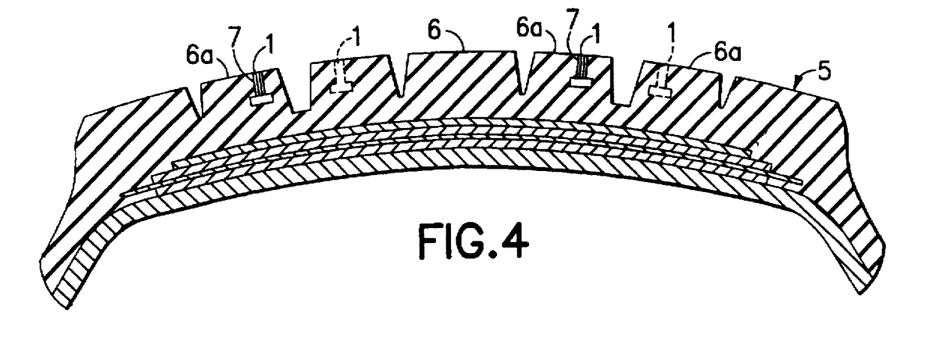
FIG. 4 is a cross-sectional view taken along the line X—X of the tire shown in FIG. 3.

FIGS. 1–6 are views showing a vehicle tire and slip-preventing member for use in a first embodiment of the present invention. FIGS. 1 and 2 show a first embodiment of the slip-preventing member of the present invention. The slip-preventing member 1 includes an annular portion 2 which is made, for example, of metal. The annular portion 2 forms a central opening 2a1 which receives a main body 3 which is inserted therein. In this embodiment, the annular portion 2 is formed to provide a container-like shape with a standing portion 2b beginning at the circumference of the bottom portion 2a. The composition of the annular portion 2 can include, for example, iron, carbon fiber, ceramic or the like.

The main body 3 comprises a fixing portion 3b and a plurality of wire members 3a. The fixing portion is a circular plate flange-like member to which one end of each wire member adheres. Furthermore, in this embodiment, a thermoplastic resin mono-filament material is used for each of the wire members 3a, and the wire members 3a are made to adhere to the fixing portion 3b by a heat welding process. Due to its thermoplastic properties, the fixing portion 3b can be molded to form a circular plate shape at the time the wire members 3a are heat welded to it. This results in an efficient, low-cost manufacturing process. Of course, the flange-like fixing portion 3b is not constrained to the above-mentioned composition and manufacturing process. Additionally, the diameter of the fixing portion 3b is sized greater than the central opening 2a1 of the annular portion 2 so that the fixing portion is secured therein. The actual diameter of the fixing portion may vary somewhat without effecting the function of the slip-preventing member 1.

The main body 3 of the slip-preventing member 1 is firmly fixed to the annular portion 2 by inserting and passing the plurality of wire members 3a through the opening of the bottom portion 2a. The fixing portion 3b of the main body 3 is secured to the bottom portion 2a by filling the annular portion 2 with an adhesive agent 4, as shown in FIG. 2(a). The adhesive agent hardens in the annular portion 2, securing the fixing portion 3b of the main body 3 therein.

The size and hardness of the wire members 3a of the main body 3 will now be discussed. Advantageously, the thickness of each individual wire member in the plurality of wire members 3a is approximately 0.4–0.7 mm, and the total number of slip-preventing members in a tire is approximately 120–140. Furthermore, the length t1 of the wire members 3a is set to approximately twice the thickness or diameter t2 of the plurality of wire members. The Vickers hardness of the wire members is set in a range of approximately 100–180 kg/mm². This hardness range results in sufficient flexibility and restorability of the wire members and does not harm the roadway surface.

The wire members 3a have a restorability such that the wire will restore to within approximately one degree of its original straight line shape when bent 180 degrees. In addition to the hardness, restorability, and flexibility described above, the wire material 3a used in this embodiment is durable and resistant to efflorescence and hydrosol. The wire material is also impervious to neutrality, acidity, and alkalinity, and can maintain the above properties in a temperature environment of −30° C. to 120° C.

Next, referring to FIGS. 3–6, a first embodiment of a use of the slip-preventing member 1 of the present invention in a slip-preventing vehicle tire will be described. The slip-preventing tire 5 is constructed such that a plurality (e.g., 120–140) of the above-described slip-preventing members 1 are buried in a radial, bias or other existing type of tire. A groove 7 is formed extending inwardly from a contact surface (tread surface) 6a of the tread portion 6 of the tire 5. The slip-preventing member 1 is fixed in the tire by pressing and inserting it into the groove 7. This can be readily accomplished using a well-known striking tool.

Figure 5:
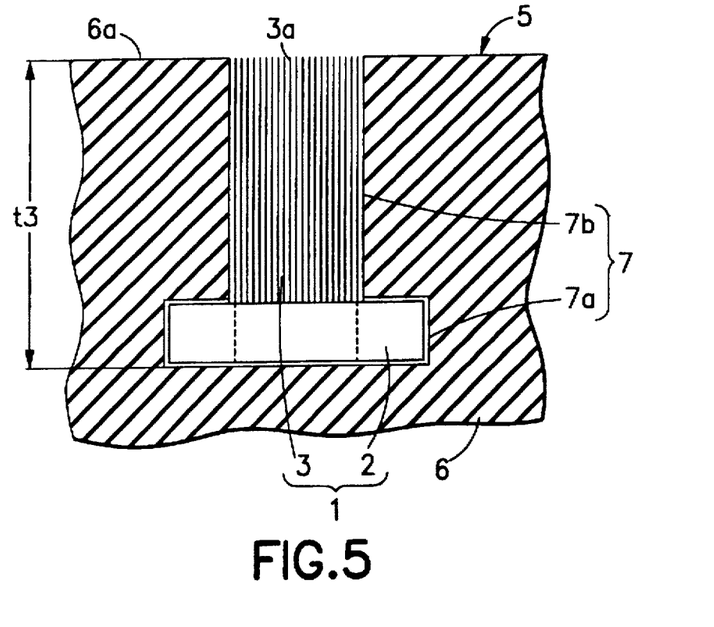
FIG. 5 is a magnified view of FIG. 4.
Figure 6:
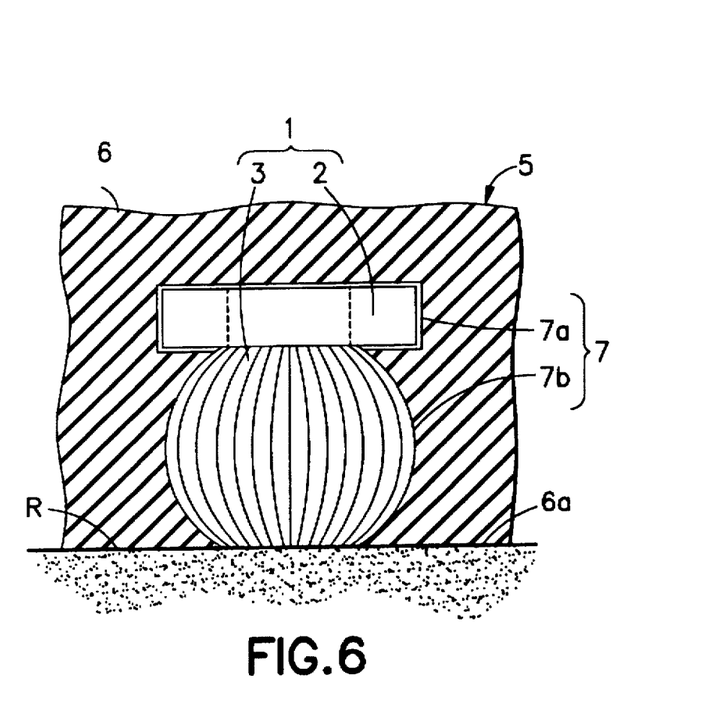
FIG. 6 is a magnified view showing the slip-preventing member of FIG. 5 at a time when the member contacts the roadway.

The groove 6 includes a securing portion 7a and a cylindrical portion 7b (FIGS. 5 and 6). The securing portion 7a secures the annular portion 2 of the slip-preventing member 1, while the cylindrical portion 7b surrounds the wire members 3a of the main body 3. It is understood by those skilled in the art that the groove need not be precisely cylindrical but may have other cross-sectional profiles, including, for instance, square, rectangular, or elliptical. The groove depth t3 is determined such that the free ends of the wire members 3a are positioned approximately adjacent to the tread surface 6a. However, not all of the free ends of the wire members need be on the same surface as the tread surface 6a. That is, the length of the wire members may be adjusted such that some of the free ends are recessed or protrude from the tread surface 6a.

In the slip-preventing vehicle tire 5 discussed above, the groove 7 will form a substantially cylindrical shape when the tread surface 6 is not in contact with the road surface (FIG. 5). In contrast, when the tread surface is in contact with the road surface R (FIG. 6), the weight of the vehicle will cause the groove 7 to deform to a roughly spherical shape. The walls of the cylindrical portion 7b of the groove 7 will be deformed outwardly relative to a longitudinal axis of the groove (not shown). Accordingly, the volume of the groove 7 will be increased relative to the non-deformed state, creating a reduced pressure therein that acts to draw water or snow into the groove. As a result, an adhering force is created between the tread surface 6a and road surface R, thereby advantageously increasing the traction of the tire.

For example, when there is a thin film of water interposed between the tread surface 6a and the road surface R, the water is drawn into the groove by the reduced pressure therein, allowing the tread surface 6a to directly contact the road surface R. While of course, the amount of water that can be drawn into the grooves is not unlimited, the present invention improves traction and can prevent hydroplaning in many circumstances. This can make a critical difference in allowing the motorist to maintain control of the vehicle.

Furthermore, the water drawn into the groove 7 is held there among the wire members 3a due to a capillary phenomenon. That is, because of the fine gaps created among the plurality of wire members 3a in the groove 7, the water drawn into the groove 7 will be held there due to surface tension between the water and the wire members 3a. Additionally, the water will tend to be drawn further along the wires and into the groove. The adhering force created between the tread surface 6a and the road surface R is therefore maintained as the groove continues to rotate through the contact region. The strong gripping force of the tire is therefore also maintained.

When the slip-preventing tire of the present invention is operated on a frozen or snow-packed road, a temperature drop is produced between the wire members 3a and the road surface R such that the groove 7 at the tread surface 6a and peripheral portions are frozen to the road surface R. Thus, a stronger gripping force results.

Furthermore, when the groove 7 is deformed due to contact with the road and the weight of the vehicle, the wire material 3a of the slip-preventing member 1 will begin to protrude from the tread surface and dig into the frozen roadway. This also causes an increase in the gripping force of the tire, particularly on icy or snow-packed roads. However, this digging or scratching action between the wire members 3a and the road surface will not damage the road, since the road will typically have a greater surface hardness than the wire members. For example, typical surface hardness levels for a concrete road are 200–300 kg/mm², while for asphalt paved roads the figure is 180–200 kg/mm². Since the wire members have a hardness of only 100–180 kg/mm², the slip-preventing device will not tend to damage the road and throw up dust and debris.

Additionally, since the slip-preventing member 1 and groove 7 are deformed when they contact the road surface, there is no excessive shock or vibration transmitted to the tire and the vehicle. Moreover, the wire members 3a will tend to wear at the same rate as the tire tread so that the positional relationship between the tread surface 6a and the free ends of the wire members of the slip-preventing member is maintained.

As the tire rotates, the groove 7 is moved to a non-contact position with the road surface R. The water or snow held within the wire material 3a in the groove is discharged by the centrifugal force caused by the rotation of the tire. Additionally, the deformed groove will be restored to its original state (FIG. 5). This eliminates the reduced pressure in the groove which produced the traction-enhancing sucking force.

Furthermore, braking test results of the slip-preventing vehicle tire in accordance with the present invention are presented. A comparison is made between the present invention and a conventional studless tire in FIGS. 12 and 13(a)–13(d). The test results include a braking distance and a braking time. The road surfaces tested were a so-called mirror-bahn, which is a smooth road, and a so-called rugged bahn, which is a road with packed or pressed snow. Additionally, results were determined for an on-road vehicle and an off-road vehicle.

As is clear from the test results, the vehicle tire of the present invention exhibits greatly improved braking distances and braking times relative to a conventional studless tire for either type of road surface. Particularly, at a low-speed running (20 km/h) on a mirror-bahn, where many accidents occur due to tire slippage, a remarkable improvement is seen in the braking distance. For example, for the on-road vehicle running on the mirror bahn at 20 km/h, braking distance was decreased from 23.45 m to 8.06 m. For the off-road vehicle, braking distance was decreased from 29.07 m to 11.92 m.

This is extremely advantageous in city environments, where typically low-speed running occurs on a mirror-bahn type of road. Therefore, when the vehicle tire of the present invention is used, it is anticipated that many accidents due to tire slippage can be prevented. This is very desirable, of course, because of the potential to reduce injuries and property damage.

The test described has also shown that tire noise is lower at all running conditions relative to the conventional spiked tire.

Figure 7:
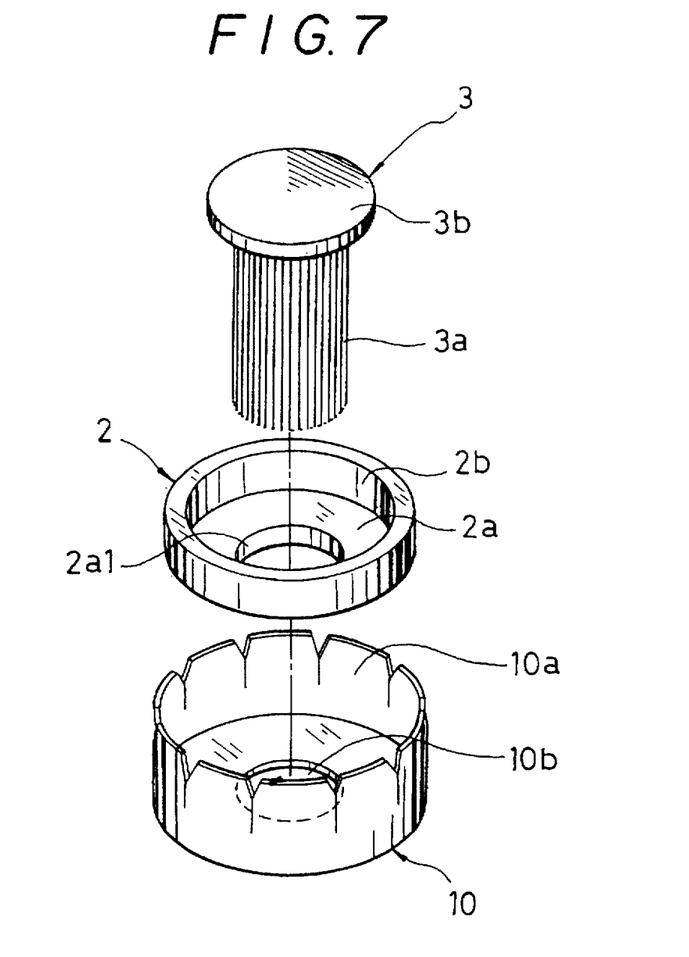
FIG. 7 is an exploded perspective view showing a slip preventing member in a second embodiment of the present invention.

It should be noted that, in the first embodiment discussed above, the main body 3 of the slip-preventing member and the annular portion 2 are fixed together by using an adhesive agent. However, as shown in FIGS. 6 and 7, in a second embodiment of the invention, an adhesive agent need not be used. Instead, the main body 3 is fixed in the groove of the tire by using an annular clamp 10.

Figure 8:
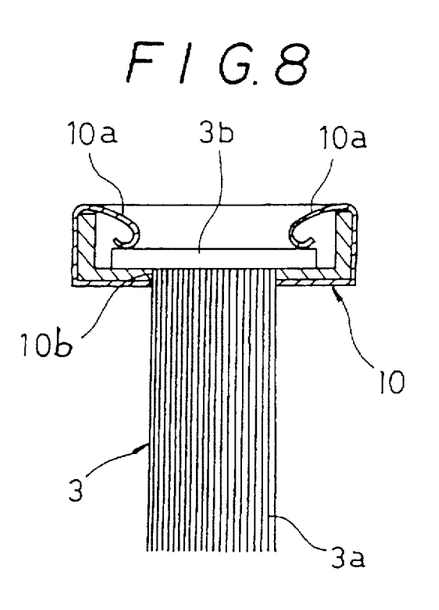
FIG. 8 is a partial cross-sectional view of the slip-preventing member of FIG. 7.

The annular clamp 10 forms a cylindrical shape which is capable of covering an external surface of the annular portion 2. At the same time, a passing-through hole 10b is formed which allows the wire members 3a to pass through. A container-like shape with a standing portion 10a beginning at the circumference of the bottom portion of the member 10 is also formed. The standing portion 10a of the annular clamp 10 includes a serrated pattern which allows the top portion of the standing portion 10a to be folded or crimped. As is known to those skilled in the art, the annular portion 2 can be secured to the circular plate fixing portion 3b of the main body 3 by crimping the top portion of the standing portion 10a of the annular clamp 10 (See FIG. 8).

In regard to securing the main body 3 and the annular portion 2 of the slip-preventing member in the tread portion 6 of the tire 5, it is desirable to secure the annular portion 2 to a position which is further inward than the tread portion of the tire. For instance, as shown in the third embodiment of the present invention depicted in FIG. 9, a reinforcing belt (belt of breaker) which is polymerized to the carcass of the tire 5 is provided beneath the tread of the tire. A groove 8 passes through the tread portion 6, and a wire material 9a projects radially from the reinforcing belt through the groove 8. This embodiment provides the same traction-enhancing advantages as the previous embodiments due to the water-sucking action produced by the deformation of the groove, and the gripping action of the wire material 9a on the road surface. As a result, a strong gripping force is obtained by the vehicle tire on the roadway.

Figure 9:
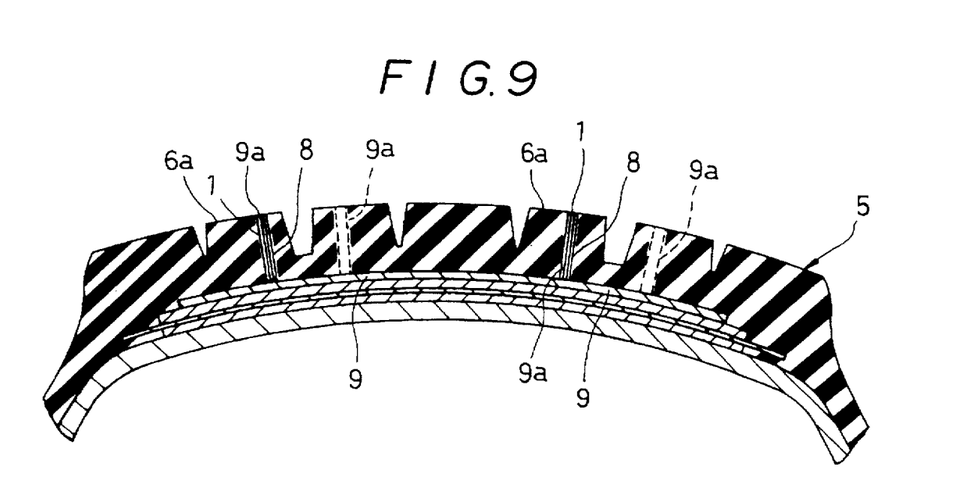
FIG. 9 is a cross-sectional view of the slip-preventing tire in accordance with the third embodiment of the present invention.

Furthermore, the wire material 9a shown in FIG. 9 can be constructed by projecting a nylon cord or the like radially from the reinforcing band 9a. The nylon cord can be made integral with the reinforcing band 9a.

Figure 10:
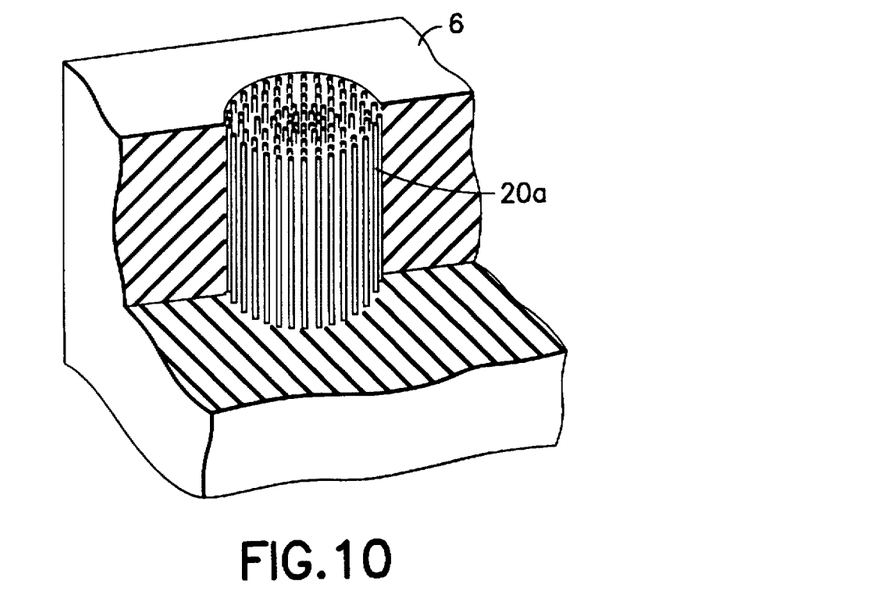
FIG. 10 is a partial cross-sectional view showing a fourth embodiment of the present invention.

FIG. 10 shows a fourth embodiment of the present invention. A slip-preventing portion 20a is formed with a plurality of wire members. The wire members, free at one end, are integrally formed with the tread 6 at the other end. Similar to the previous embodiments, this embodiment will provide increased traction for a vehicle tire.

Figure 11:
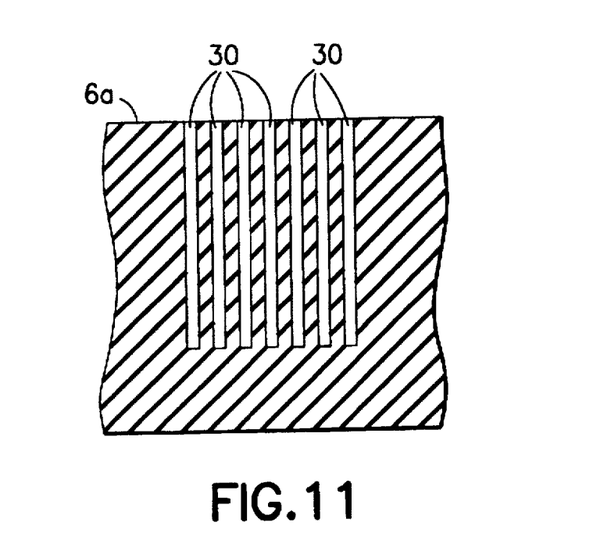
FIG. 11 is a cross-sectional view showing an essential portion of the fifth embodiment of the present invention.
Figure 12:
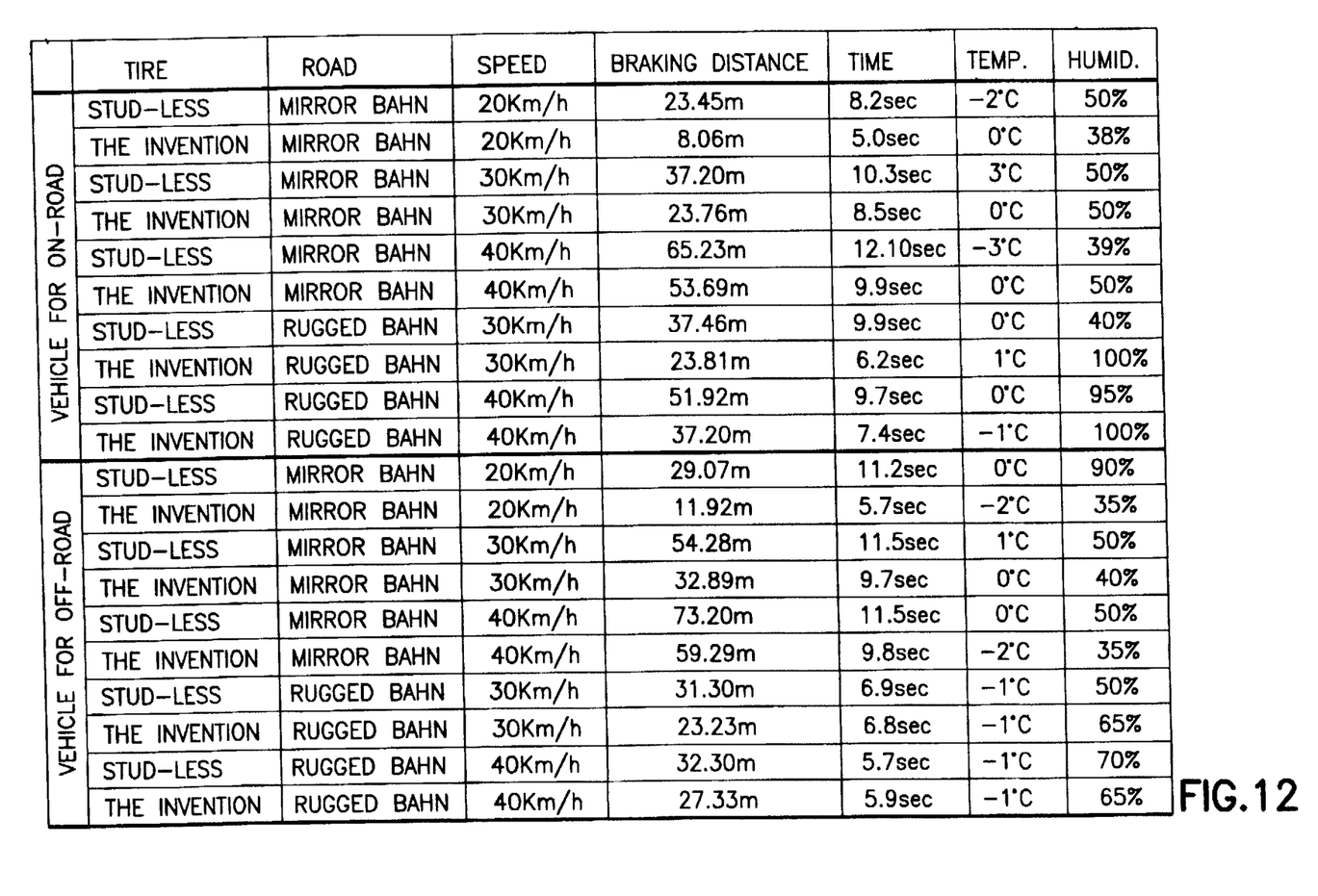
FIG. 12 is a table illustrating braking test results of the vehicle tire in accordance with the first embodiment of the present invention and a conventional studless tire.
Figure 13A:
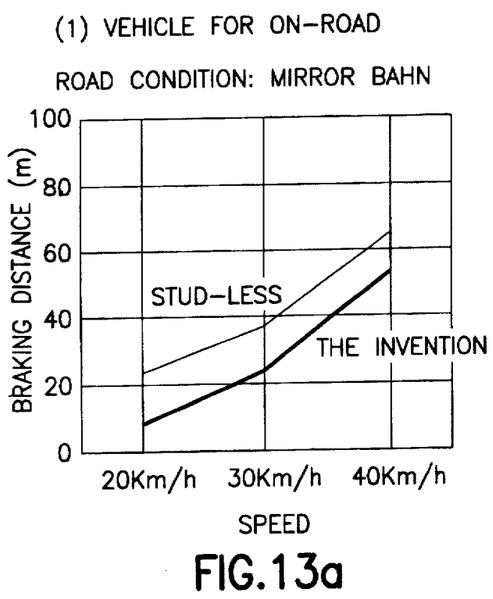
FIGS. 13(a)–13(d) is a graph illustrating the results of the table of FIG. 12.
Figure 13B:
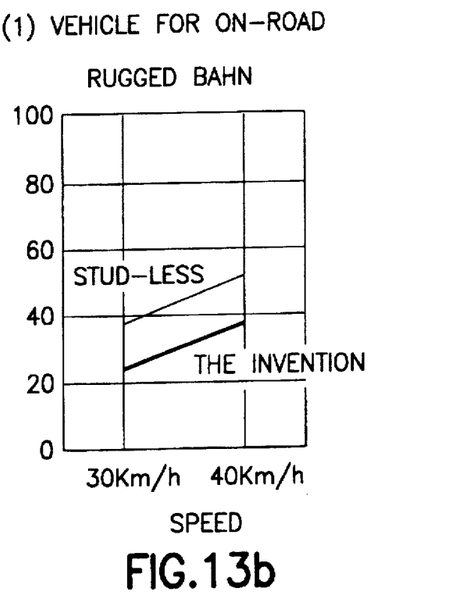
Figure 13C:
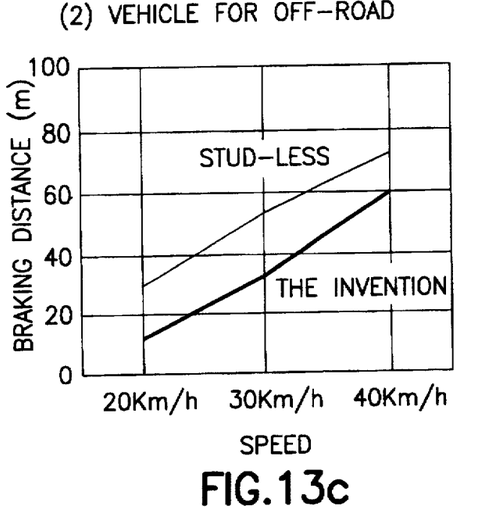
Figure 13D:
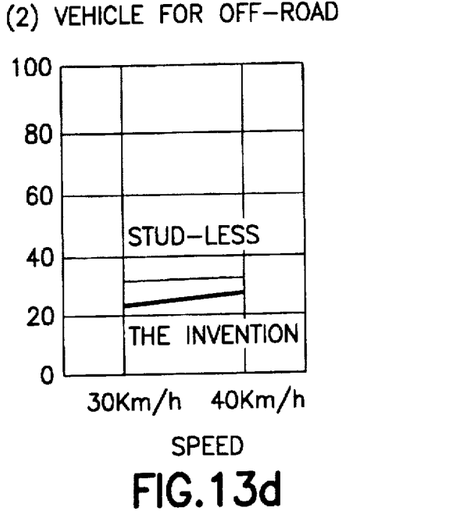

FIG. 11 shows a fifth embodiment of the present invention. Fine gaps 30 of predetermined depth are collectively formed in the tread 6 of the tire. The gaps 30 form a plurality of tread members which extend radially toward the surface of the tread. The gaps 30 increase traction by drawing and holding water or snow away from the road surface. As a result, the tread surface may more firmly contact the road surface, and the grip of the vehicle tire is improved.

The effect of the present invention is described below. As discussed above, in accordance with the present invention, the braking and handling properties of a vehicle tire running on a wet, frozen or snow-packed road are similar to a conventional spiked tire, and are greatly improved compared to a conventional studless tire. Tire noise is also significantly reduced relative to the spiked tire.

Accordingly, the present invention can greatly reduce vehicle accidents caused by tire slippage. This results in fewer injuries and property damage, and also improves traffic flow. As a result, traffic delays are reduced, and a larger traffic quantity can be safely handled on a roadway. Moreover, the present invention does not cut out the road surface when the tire runs on a dry road surface, and the tire does not throw up dust or other debris from the road. This is a very useful advantage from the standpoint of improving the life span and maintenance expense of the road, and also results in a more pleasant environment due to the reduced amount of dust and debris thrown up into the air.

Further in accordance with the present invention, the tread surface has a very good ability to repel water when the tire operates on a wet road. Therefore, a strong gripping force is obtained not only on a frozen or snow-packed road, but also on a wet road. As a result, excellent braking and handling performance characteristics are observed in all seasons.

Although the invention has been described in connection with various specific embodiments, those skilled in the art will appreciate that numerous adaptations and modifications may be made thereto without departing from the spirit and scope of the invention as set forth in the claims.

What is claimed is:

1. A slip-preventing vehicle tire with at least one groove fashioned therein for receiving a slip-preventing member, said slip-preventing member comprising:
  a flat plate fixing element with a central region and a peripheral region;
  a plurality of independent wire members affixed in a substantially equi-spaced manner to said central region of said fixing element; and
  an annular holder comprising a bottom portion which defines a central opening, and a side wall extending from said bottom portion; wherein:
    said peripheral region of said fixing element is affixed to said bottom portion of said annular holder such that said wire members extend through said central opening;
    said at least one groove comprises a first elongated portion extending from the surface of the tire inwardly, and a second portion extending further inwardly from said first portion;
    said first and second portions of the at least one groove being dimensioned to secure said fixing element and annular holder;
    said wire members extend unguided through said first elongated portion of said at least one groove so as to be able to deform therein when said tire surface is in contact with a road surface, and terminate at a position substantially coplanar with the surface of the tires;
    each of said wire members has a thickness of approximately 0.4 mm to approximately 0.7 mm, and a hardness of approximately 100 to approximately 180 kg/mm$^2$;
    said at least one groove is adapted to undergo a substantially uniform deformation about a central longitudinal axis thereof when said tire surface is in contact with the road surface;
    said deformation of said wire members corresponds to said deformation of said elongated portion;
    said deformation of said at least one groove creates a reduced pressure in said elongated portion of said at least one groove, said reduced pressure creating an adhering force between said tire surface and said road surface;
    said reduced pressure causes water from the road surface to be drawn into said elongated portion; and
    said wire members are adapted to hold the water due to a surface tension between the water and said wire members.

2. The tire of claim 1 wherein said elongated portion and said fixing element are substantially cylindrical.

3. The tire of claim 1 wherein said plurality of wire members has a length t1 which is approximately twice the width t2 of said plurality of wire members.

4. The tire of claim 1 wherein said wire members are comprised of a thermoplastic resin monofilament material.

5. The tire of claim 1 wherein said peripheral region of said fixing element is affixed to said bottom portion of said annular holding portion using an adhesive agent.

6. The tire of claim 1 further comprising an annular clamp, said annular clamp comprising:
  a bottom portion which defines a central opening, and a side wall extending from said bottom portion;
  said side wall of said annular clamp being serrated at a top portion thereof for crimpably affixing said fixing element to said annular holding portion such that said plurality of wire members extend through said central opening of said annular clamp.

7. A slip-preventing vehicle tire with at least one groove fashioned therein, said tire comprising:
   a reinforcing belt polymerized to a carcass of the tire;
   a plurality of independent wire members affixed in a substantially egui-spaced manner to said reinforcing belt; wherein:
   said at least one groove comprises an elongated portion extending from a surface of the tire inwardly toward said reinforcing belt;
   said wire members extend unguided through said elongated portion of said at least one groove so as to be able to undergo a deformation therein when said tire surface is in contact with a road surface, and terminate at a position substantially coplanar with the surface of the tire;
   each of said wire members has a thickness of approximately 0.4 mm to approximately 0.7 mm, and a hardness of approximately 100 to approximately 180 kq/mm$^2$;
   said elongated portion is adapted to undergo a substantially uniform deformation about a central longitudinal axis thereof when said tire surface is in contact with the road surface;
   said deformation of said wire members corresponds to said deformation of said elongated portion;
   said deformation of said elongated portion creates a reduced pressure therein, thereby also creating an adhering force between said tire surface and said road surface; and
   said reduced pressure is adapted to cause water to be drawn into said at least one groove from the road surface and held by said wire members due to a surface tension between the water and said wire members.

8. The tire of claim 7 wherein said plurality of wire members has a length t1 which is approximately twice the width t2 of said plurality of wire members.

9. The tire of claim 7 wherein said wire members are comprised of a thermoplastic resin monofilament material.

10. A slip-preventing vehicle tire with at least one groove fashioned therein, said tire comprising:
    a tread portion;
    wherein said at least one groove comprises an elongated portion extending from a surface of the tread portion of the tire inwardly to a predetermined depth;
    a plurality of independent wire members affixed in a substantially equi-spaced manner to said tread portion at said predetermined depth;
    wherein said wire members extend unguided through said elongated portion of said at least one groove so as to be able to deform therein when said tire surface is in contact with a road surface, and terminate at a position substantially coplanar with the surface of the tire;
    each of said wire members has a thickness of approximately 0.4 mm to approximately 0.7 mm, and a hardness of approximately 100 to approximately 180 kg/mm$^2$;
    said elongated portion is adapted to underdo a substantially uniform deformation about a central longitudinal axis thereof when said tire surface is in contact with the road surface;
    said deformation of said wire members corresponds to said deformation of said elongated portion;
    said deformation of said elongated portion creates a reduced pressure therein, thereby also creating an adhering force between said tire surface and said road surface; and
    said reduced pressure is adapted to cause water to be drawn into said at least one groove from the road surface and held by said wire members due to a surface tension between the water and said wire members.

11. The tire of claim 10 wherein said elongated portion of said at least one groove is substantially cylindrical.

12. The tire of claim 10 wherein said plurality of wire members has a length t1 which is approximately twice the width t2 of said plurality of wire members.

13. A slip-preventing member for a vehicle tire, said tire having a groove fashioned therein for receiving said slip-preventing member, said groove comprising a first elongated portion extending from the surface of the tire inwardly, and a second portion extending further inwardly from said first portion, said slip-preventing member comprising:
    a flat plate fixing element with a central region and a peripheral region;
    a plurality of independent wire members affixed in a substantially equi-spaced manner to said central region of said fixing element; and
    an annular holder comprising a bottom portion which defines a central opening, and a side wall extending from said bottom portion; wherein:
    said peripheral region of said fixing element is affixed to said bottom portion of said annular holder such that said wire members extend through said central opening;
    said fixing element and annular holder are dimensioned to be secured by the first and second portions of said groove; and
    said wire members are adapted to extend unguided through said first elongated portion of said groove so as to be able to deform therein when said tire surface is in contact with a road surface, and terminate at a position substantially coplanar with the surface of the tire;
    each of said wire members has a thickness of approximately 0.4 mm to approximately 0.7 mm, and a hardness of approximately 100 to approximately 180 kq/mm$^2$;
    said elongated portion is adapted to undergo a substantially uniform deformation about a central longitudinal axis thereof when said tire surface is in contact with the road surface;
    said deformation of said wire members corresponds to said deformation of said elongated portion;
    said deformation of said elongated portion creates a reduced pressure therein, thereby also creating an adhering force between said tire surface and said road surface; and
    said reduced pressure is adapted to cause water to be drawn into said at least one groove from the road surface and held by said wire members due to a surface tension between the water and said wire members.

14. The slip-preventing member of claim 13, wherein:
    said plurality of wire members has a length t1 which is approximately twice the width t2 of said plurality of wire members.

15. The slip-preventing member of claim 13, wherein:
each of said wire members has a thickness of approximately 0.4 mm to approximately 0.7 mm.

16. The slip-preventing member of claim 13, wherein:
said wire members have a hardness of approximately 100 to approximately 180 kg/mm$^2$.

17. The slip-preventing member of claim 13, wherein:
said wire members are comprised of a thermoplastic resin monofilament material.

18. The slip-preventing member of claim 13, wherein:
said peripheral region of said fixing element is affixed to said bottom portion of said annular holding portion using an adhesive agent.

19. The slip-preventing member of claim 13, further comprising an annular clamp, said annular clamp comprising:

a bottom portion which defines a central opening, and a side wall extending from said bottom portion;

said side wall of said annular clamp being serrated at a top portion thereof for crimpably affixing said fixing element to said annular holding portion such that said plurality of wire members extend through said central opening of said annular clamp.

\* \* \* \* \*